(12) United States Patent
Meng et al.

(10) Patent No.: US 11,613,007 B2
(45) Date of Patent: Mar. 28, 2023

(54) INTELLIGENT ROBOTIC SYSTEM FOR AUTONOMOUS AIRPORT TROLLEY COLLECTION

(71) Applicant: The Chinese University of Hong Kong, Hong Kong (CN)

(72) Inventors: Max Qing Hu Meng, Hong Kong (CN); Chaoqun Wang, Hong Kong (CN); Tingting Liu, Hong Kong (CN); Xiaochun Mai, Hong Kong (CN); Chenming Li, Hong Kong (CN); Danny Ho, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 464 days.

(21) Appl. No.: 16/819,973

(22) Filed: Mar. 16, 2020

(65) Prior Publication Data
US 2021/0283770 A1 Sep. 16, 2021

(51) Int. Cl.
*B25J 9/12* (2006.01)
*B25J 9/16* (2006.01)
(Continued)

(52) U.S. Cl.
CPC ............. *B25J 9/162* (2013.01); *B25J 5/007* (2013.01); *B25J 9/1697* (2013.01); *B25J 9/04* (2013.01);
(Continued)

(58) Field of Classification Search
CPC .... G05D 1/027; G05D 1/0274; G05D 1/0251; G05D 1/024; G05D 2201/0216;
(Continued)

(56) References Cited

U.S. PATENT DOCUMENTS 10,071,893 B2 * 9/2018 High ........................ A47F 13/00
10,915,113 B2 * 2/2021 Crawley ................ B25J 9/0087
(Continued)

OTHER PUBLICATIONS

Chen et al., A Robotic Lift Assister: A Smart Companion for Heavy Payload Transport and Manipulation in Automotive Assembly, 2018, IEEE, pg. (Year: 2018).*
(Continued)

*Primary Examiner* — McDieunel Marc
(74) *Attorney, Agent, or Firm* — Saliwanchik, Lloyd & Eisenschenk (57) ABSTRACT

A robotic trolley collection system and methods for automatically collecting baggage/luggage trolleys are provided. The system includes a differential-driven mobile base; a manipulator mounted on the differential-driven mobile base for forking a trolley, having a structure same as a head portion of the trolley; a sensory and measurement assembly for providing sensing and measurement dataflow; and a main processing case for processing the sensing and measurement dataflow provided by the sensory and measurement assembly and for controlling the differential-driven mobile base, the manipulator, and the sensory and measurement assembly. The method includes localizing and mapping the robotic trolley collection system; detecting an idle trolley to be collected and estimating pose of the idle trolley; visually servoing control of the robotic trolley collection system; and issuing motion control commands to the robotic trolley collection system for automatically collecting the idle trolley.

20 Claims, 4 Drawing Sheets

(51) Int. Cl.
  *B25J 5/00*    (2006.01)
  *B25J 9/04*    (2006.01)
  *B25J 13/08*   (2006.01)
  *B25J 11/00*   (2006.01)
  *B25J 18/00*   (2006.01)
  *B25J 19/02*   (2006.01)

(52) U.S. Cl.
  CPC .............. *B25J 9/123* (2013.01); *B25J 11/008* (2013.01); *B25J 13/086* (2013.01); *B25J 18/007* (2013.01); *B25J 19/022* (2013.01); *B25J 19/023* (2013.01)

(58) Field of Classification Search
  CPC . B25J 9/162; B25J 9/1697; B25J 5/007; B25J 18/007; B25J 9/04; B25J 19/023; B25J 11/008; B25J 13/086; B25J 19/022; B25J 9/123
  See application file for complete search history.

(56) References Cited

U.S. PATENT DOCUMENTS 11,086,328 B2 *  8/2021  Keivan ................ G05D 1/0214
2018/0072212 A1 *  3/2018  Alfaro ........................ B60P 1/48

OTHER PUBLICATIONS

Luo et al., Multisensor Fusion and Integration: Approaches, Applications, and Future Research Directions, 2002, IEEE, p. 107-119 (Year: 2002).*

Ryumin et al., Human-Robot Interaction with Smart Shopping Trolley Using Sign Language: Data Collection, 2019, IEEE, p. 949-954 (Year: 2019).*

Wang et al., Path Planning for Nonholonomic Multiple Mobile Robot System with Applications to Robotic Autonomous Luggage Trolley Collection at Airports, 2020, IEEE, p. 2726-2733 (Year: 2020).*

Wang et al., Coarse-to-Fine Visual Object Catching Strategy Applied in Autonomous Airport Baggage Trolley Collection, 2020, IEEE, pg. (Year: 2020).*

Song, S. et al., "6-D Magnetic Localization and Orientation Method for an Annular Magnet Based on a Closed-Form Analytical Model," *IEEE Transactions on Magnetics*, Sep. 2014, 50(9):1-11, IEEE.

Li, Y. et al., "Fast and Robust Data Association Using Posterior Based Approximate Joint Compatibility Test," *IEEE Transactions on Industrial Informatics*, Feb. 2014, 10(1):331-339, 2013 IEEE.

Sun, Y. et al., "Improving RGB-D SLAM in dynamic environments: A motion removal approach," *Robotics and Autonomous Systems*, 2017, 89:110-122, 2016 Elsevier B.V.

Luo, C. et al., "Neural-Dynamics-Driven Complete Area Coverage Navigation Through Cooperation of Multiple Mobile Robots," *IEEE Transactions on Industrial Electronics*, Jan. 2017, 64(1):750-760, 2016 IEEE.

Wang, L. et al., "Real-Time Multisensor Data Retrieval for Cloud Robotic Systems," *IEEE Transactions on Automation Science and Engineering*, Apr. 2015, 12(2):507-518, IEEE.

* cited by examiner

INTELLIGENT ROBOTIC SYSTEM FOR AUTONOMOUS AIRPORT TROLLEY COLLECTION

BACKGROUND OF THE INVENTION

There are more than 50,000 airports around the world. Many of them are seeking solutions to automate the baggage/luggage trolley collection processes, especially for the airports in the areas with high labor cost. In order to solve the problems of high cost and low efficiency of the collection of airport baggage/luggage trolleys, electronic tugs for trolley collection and transportation have been widely proposed.

BRIEF SUMMARY OF THE INVENTION

There continues to be a need in the art for improved designs and techniques for a robotic trolley collection system for automatically collecting trolleys such as the baggage/luggage trolleys in airports.

Embodiments of the subject invention pertain to a robotic trolley collection system and methods for automatically collecting trolleys such as the baggage/luggage trolleys of airports, without requiring remodeling the existing trolleys.

According to an embodiment of the subject invention, a robotic trolley collection system can comprise a differential-driven mobile base; a manipulator mounted on the differential-driven mobile base for engaging a trolley, having a structure same as a head portion of the trolley; a sensory and measurement assembly for providing sensing and measurement dataflow; and a main processing case for processing the sensing and measurement dataflow provided by the sensory and measurement assembly and for controlling the differential-driven mobile base, the manipulator, and the sensory and measurement assembly. The differential-driven mobile base comprises a mobile chassis having a plurality of driving wheels, a plurality of direct current (DC) motors, and at least one gearbox; and the plurality of driving wheels is propelled by the plurality of direct current (DC) motors, respectively, through the at least one gearbox for driving the robotic trolley collection system. The differential-driven mobile base further comprises a plurality of omnidirectional passive castor wheels disposed at back of the differential-driven mobile base for support. The differential-driven mobile base further comprises a protective ring attached to the mobile chassis and a plurality of proximity switches for obstacle avoidance. The manipulator is coupled to a front end of the differential-driven mobile base, and wherein the manipulator comprises three connections including two hinge sections at the front end of the differential-driven mobile base and a flexible connection having an electronic cylinder disposed in a middle part of the differential-driven mobile base. When the manipulator is coupled to the back portion of the trolley, the manipulator is configured to fork the trolley. Furthermore, the sensory and measurement assembly is disposed on top of the main processing case that is disposed on top of the differential-driven mobile base. The main processing case comprises a controller or a data processor for receiving the dataflow from the sensory and measurement assembly and generating control commands that are transmitted to the manipulator, the differential-driven mobile base, or the sensory and measurement assembly. The sensory and measurement assembly comprises a three dimensional (3D) light detection and ranging (LiDAR) device for localization of the robotic trolley collection system and for obstacle avoidance and can additionally comprise a depth camera for detecting an idle trolley and estimating pose of the idle trolley and a plurality of ultrasound sensors disposed at front of the differential-driven mobile base for obstacle avoidance.

In certain embodiment of the subject invention, a method for operating a robotic trolley collection system is provided for automatically collecting trolleys such as the baggage/luggage trolleys of airports. The method can comprise localization and mapping; detecting an idle trolley to be collected and estimating pose of the idle trolley; visual servoing control of the robotic trolley collection system; and issuing motion control commands to the robotic trolley collection system for automatically collecting the idle trolley. The localization and mapping comprises determining location of the robotic trolley collection system and providing the determined location information of the robotic trolley collection system to allow the robotic trolley collection system to determine its position in surrounding environment. The detecting of idle trolley and estimating pose of the idle trolley comprises providing detection results of the idle trolley and estimating the pose of the idle trolley. The visual servoing comprises driving the robotic trolley collection system to approach the idle trolley, forking the idle trolley by performing servoing control of the robotic trolley collection system, and transferring the idle trolley to a desired location. Moreover, the localization and mapping the robotic trolley collection system comprises combining location information provided by a LiDAR device, a wheel odometer, or a depth camera of the robotic trolley collection system. The detecting an idle trolley comprises collecting RGB images of a trolley and establishing datasets for recognizing the trolley; annotating bounding boxes and status categories of the trolley in the RGB images; and training a deep neural network system with the collected datasets to determine if the trolley is in an idle condition and ready to be collected. Furthermore, the estimating pose of the idle trolley comprises performing a coarse pose estimating followed by performing a fine pose estimating.

In another embodiment of the subject invention, a non-transitory computer-readable medium is provided, comprising program instructions stored thereon that, when executed, cause a processor to perform a method for operating a robotic trolley collection system, the method comprising steps of localizing and mapping the robotic trolley collection system; detecting an idle trolley and estimating pose of the idle trolley; visual servoing control of the robotic trolley collection system; and issuing motion control commands to the robotic trolley collection system for automatically collecting the idle trolley.

DETAILED DISCLOSURE OF THE INVENTION

Robotic Trolley Collection System

Figure 1:
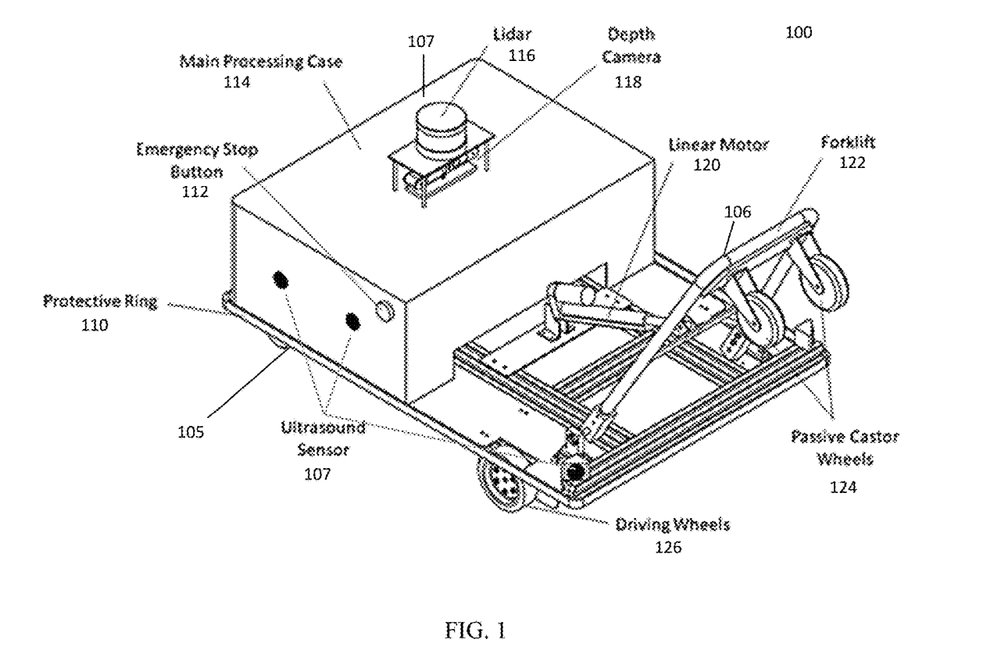
FIG. 1 is a perspective view of a baggage/luggage trolley collection robot system according to an embodiment of the subject invention.

As illustrated in FIG. 1, the robotic trolley collection system 100 such as a baggage/luggage trolley of airports can comprise a differential-driven mobile base 105, a manipulator 106 for forking the baggage/luggage trolley, a sensory and measurement assembly 107 for providing sensing and measurement dataflow, and a main processing case 114 for processing the sensing dataflow provided by the sensory and measurement assembly 107 and for controlling the differential-driven mobile base 105, the manipulator 106, and the sensory and measurement assembly 107.

Figure 2:
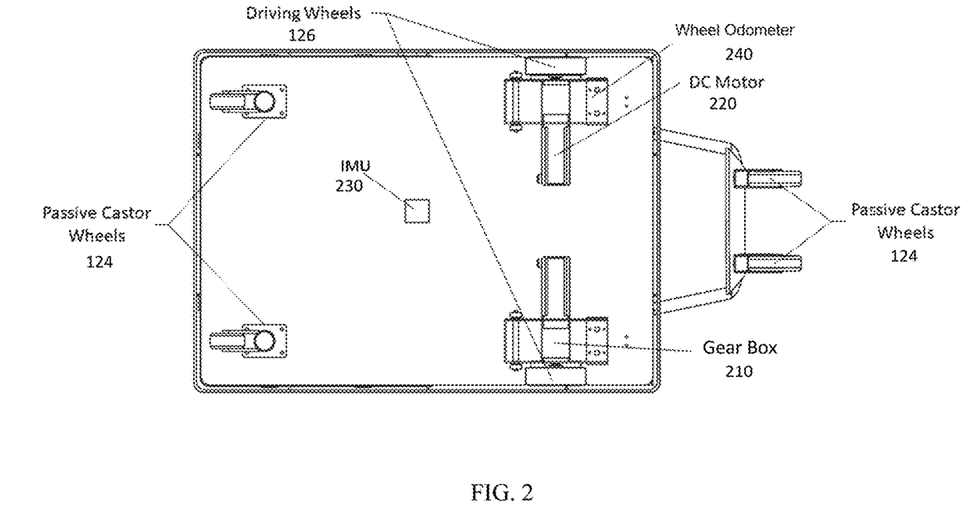
FIG. 2 is a schematic representation of a differential-driven mobile base of the baggage/luggage trolley collection robot system, according to an embodiment of the subject invention.

Referring to FIG. 2, the differential-driven mobile base 105 can comprise a mobile chassis having a plurality of, for example, two driving wheels 126 that are propelled by a plurality of, for example, two direct current (DC) motors 220 through at least one gearbox 210, for driving the baggage/luggage robotic trolley collection system 100. Moreover, a plurality of, for example, two omnidirectional passive castor wheels 124 are installed at the back of the differential-driven mobile base 105 for support, as shown in FIG. 1.

The differential-driven mobile base 105 can comprise a protective ring 110 attached to the mobile chassis and including a plurality of, for example, six proximity switches for obstacle avoidance. Thus, when the protective ring 110 collides with an obstacle, the stop emergency mechanism including an emergency stop button 112 of the robotic trolley collection system 100 will be activated to stop the robotic trolley collection system 100 from moving.

Figure 3A:
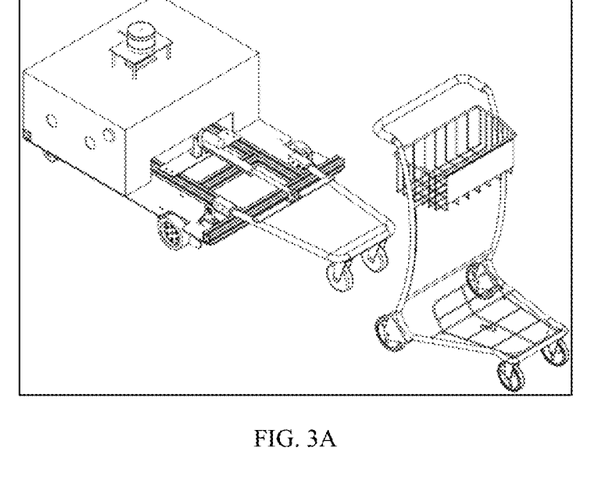
FIGS. 3A and 3B are schematic representations of the baggage/luggage trolley collection robot system forking a trolley according to an embodiment of the subject invention.
Figure 3B:
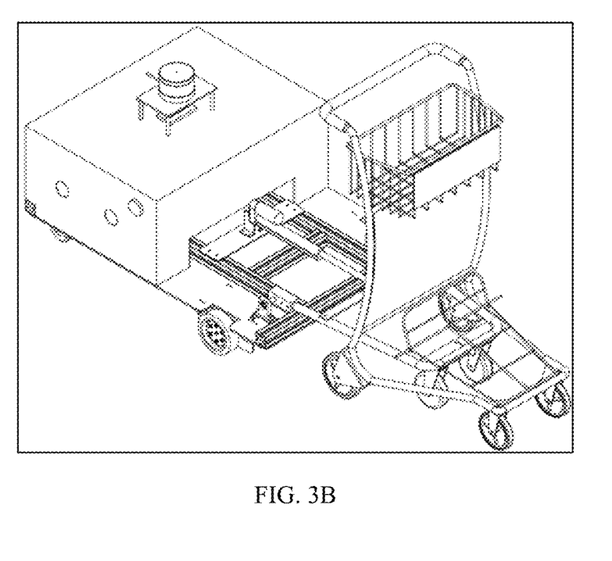

The manipulator 106, as shown in FIG. 1 and FIG. 2, is installed at a front portion of the differential-driven mobile base 105 and can comprise three connections including two hinge sections at the front of the differential-driven mobile base 105 and a flexible connection having an electronic cylinder installed in the middle of the differential-driven mobile base 105. In particular, the manipulator 106 functions to flexibly manipulate the trolley such as the baggage/luggage trolley of the airports, such that the baggage/luggage robotic trolley collection system 100 can effectively fork the trolley by coupling the manipulator 106 to the back of the baggage/luggage trolley, as shown in FIGS. 3A and 3B. Once the manipulator 106 is coupled to the back of the baggage/luggage trolley, the electronic cylinder lifts the baggage/luggage trolley above the ground for transferring the trolley to a new location.

The sensory and measurement assembly 107 is disposed on top of the main processing case 114 that is disposed on top of the robot mobile chassis of the differential-driven mobile base 105. The main processing case 114 can comprise a controller or a data processor for receiving the dataflow from the sensory and measurement assembly 107 via wires or wirelessly and generating the control commands that are transmitted to the manipulator 106, the differential-driven mobile base 105, or the sensory and measurement assembly 107.

In one embodiment, the sensory and measurement assembly 107 may comprise a three dimensional (3D) LiDAR device 116 for localization of the baggage/luggage robotic trolley collection system 100 and avoidance of obstacles on paths between the baggage/luggage trolley and the baggage/luggage robotic trolley collection system 100.

In one embodiment, the sensory and measurement assembly 107 may comprise an image capturing device such as a depth camera 118 disposed under the LiDAR device 116 for detecting an idle baggage/luggage trolley in the environment and estimating the trolley pose.

In one embodiment, the sensory and measurement assembly 107 may comprise a plurality of, for example, six ultrasound sensors 117 disposed at the front of the differential-driven mobile base 105 for avoiding the obstacles.

In one embodiment, the sensory and measurement assembly 107 may comprise an Inertial Measurement Unit (IMU) 230 mounted in the middle of the mobile chassis of the differential-driven mobile base 105. The sensory and measurement assembly 107 may additionally comprise wheel odometers 240 encoded in the motors. The IMU 230 and the wheel odometers 240 provide information for localization and navigation of the baggage/luggage robotic trolley collection system 100.

FIGS. 3A and 3B illustrate how the baggage/luggage robotic trolley collection system forks a trolley according to an embodiment of the subject invention.

Methods for Operating the Robotic Trolley Collection System

Figure 4:
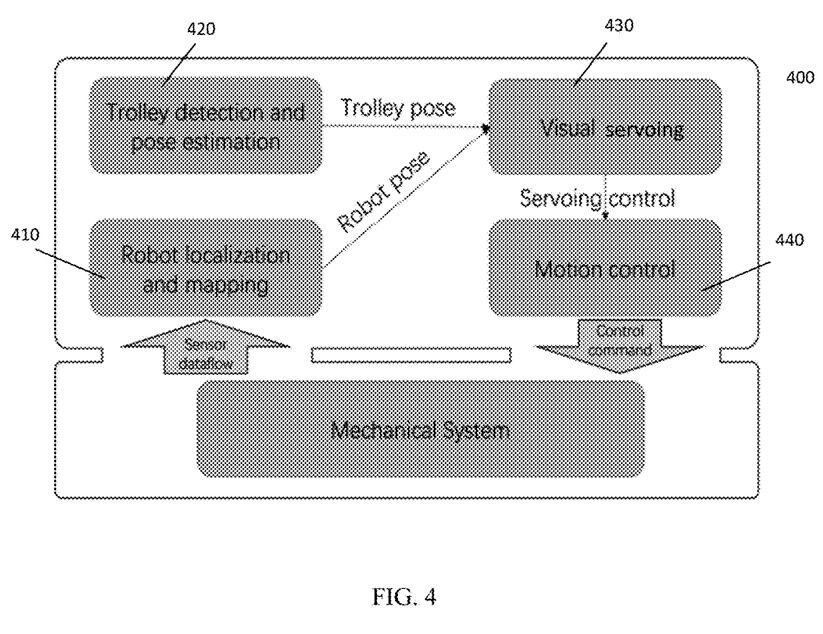
FIG. 4 is a schematic representation of a locating and analyzing method of the baggage/luggage trolley collection robot system for automatically collecting the trolley with sensor data being provided for trolley detection, according to an embodiment of the subject invention.

FIG. 4 is a schematic representation of locating and analyzing method 400 for operating of the baggage/luggage robotic trolley collection system 100 to automatically collect the baggage/luggage trolleys with sensor data being provided for trolley detection, according to an embodiment of the subject invention.

The locating and analyzing method 400 can comprise a robot localization and mapping step 410, a trolley detection and pose estimation step 420, a visual servoing step 430, and a motion control step 440.

The localization and mapping step 410 is accomplished by collecting and analyzing the location information of the baggage/luggage robotic trolley collection system 100, allowing the baggage/luggage robotic trolley collection system 100 to know where it is in an environment such as an airport.

The trolley detection and pose estimation step 420 is responsible for providing the detection results of the idle baggage/luggage trolley that needs to be collected in the environment and estimating the pose of the baggage/luggage trolley.

After the trolley pose is acquired, in the visual servoing step 430, the baggage/luggage robotic trolley collection system 100 is driven to approach the idle baggage/luggage trolley, fork the idle baggage/luggage trolley by performing servoing control of the motion control step 440, and transfer the idle baggage/luggage trolley to a desired location by issuing control commands to the baggage/luggage robotic trolley collection system 100.

1. Robot Localization

The localization of the baggage/luggage robotic trolley collection system 100 can be implemented by the sensory and measurement assembly 107 comprising the IMU 230, the multi-line laser LiDAR device 116, the depth camera 118, the wheel odometers 240, and the ultrasonic distance measuring sensors 117.

In one embodiment, the sensory and measurement assembly 107 is a multi-sensor fusion based localization system such as a Simultaneous Localization and Mapping (SLAM) module combining the location information provided by the LiDAR device 116, the wheel odometers 240, the depth camera 118, or the ultrasonic distance measuring sensors 117 of the robotic trolley collection system 100.

Moreover, in one embodiment, the depth cameras 118 can be employed to detect the natural landmarks in the environment to further improve the robot location estimation accuracy. During the operating of the baggage/luggage robotic trolley collection system 100, the mapping information can be updated in real-time according to the changes of the environment, ensuring the accuracy of the localization result.

2. Idle Baggage Trolley Recognition

The baggage detection step is to detect and identify the baggage trolley that is idle. The idle baggage trolley refers to a baggage trolley that has no baggage and not being held or pushed. The specific steps of the baggage recognition step can comprise:

1) collecting RGB images of the baggage trolley in the environment, for example, at an airport, and establishing datasets for baggage trolley recognition;

2) annotating bounding boxes and status categories (for example, idle or occupied) of the baggage trolleys in the RGB images collected;

3) training a deep neural network system or methods with the collected datasets to determine if the trolley is in an idle condition and ready to be collected.

By using the trained deep neural network system or methods, the idle trolley can be robustly detected when the baggage/luggage robotic trolley collection system 100 patrols in an environment such as an airport.

3. Baggage Trolley Pose Estimation

When an idle trolley is detected, the baggage/luggage robotic trolley collection system 100 is required to determine the trolley pose to approach and catch it. A coarse-to-fine pose estimation strategy can be utilized to drive the baggage/luggage robotic trolley collection system 100 to approach the trolley from a distance.

The pose estimation method therefore can comprise two parts, the coarse pose estimation method and the fine pose estimation method, which can be individually selected based on the distance between the baggage/luggage trolley and the baggage/luggage robotic trolley collection system 100. After the idle baggage/luggage trolley is successfully detected by the baggage/luggage robotic trolley collection system 100, a bounding box of the idle trolley can be obtained by the trained detection model. As the size of a certain trolley in the real-world is fixed, the distance between detected idle trolley and the baggage/luggage robotic trolley collection system 100 can be measured by counting the pixels inside the bounding box. If the number of the pixels inside the box is smaller than a threshold value, the idle trolley is considered as being far from the baggage/luggage robotic trolley collection system 100 and the coarse pose estimation method will be selected. Otherwise, if the number of the pixels inside the box is equal to or greater than the threshold value, the idle trolley is considered as being close to the baggage/luggage robotic trolley collection system 100 and the fine pose estimation method will be selected.

In the coarse trolley pose estimation step, the pose of the trolley is estimated based on a direction classification model. The trolley translation can be acquired by using depth information estimated by the pixels inside the bounding box.

Figure 5:
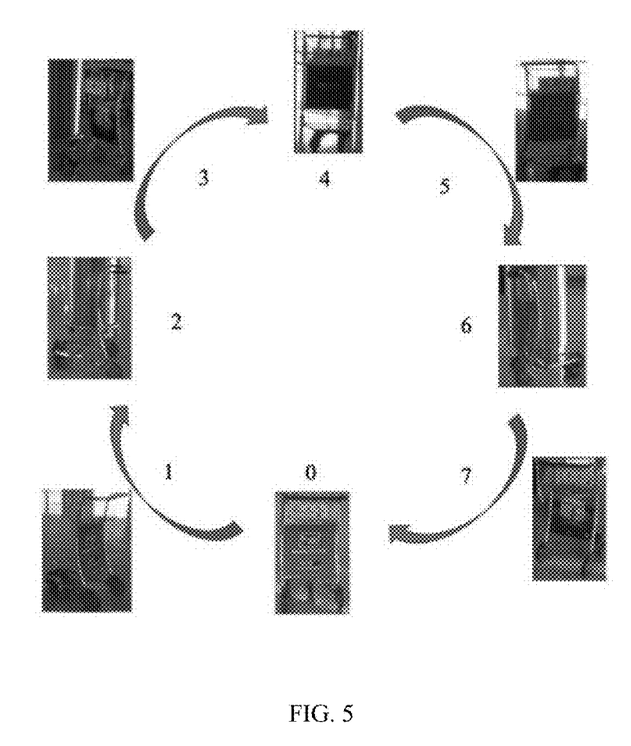
FIG. 5 is a diagram of direction classification for coarse pose estimation step of the baggage/luggage trolley collection robot system for automatically collecting the trolley, according to an embodiment of the subject invention.

The specific steps for coarse pose estimation method include:

1) in different environments, collecting images of the trolley in different poses and establishing an image dataset of idle baggage trolleys;

2) annotating the yaw rotation angle for images of the idle baggage trolley dataset; wherein the yaw rotation angle can be divided into eight different categories (0°, 45°, 90°, 135°, 180°, 225°, 270°, 315°), wherein labels are shown in the direction classification diagram of the coarse pose estimation method in FIG. 5;

3) training a classification model by using the pose dataset.

Figure 6:
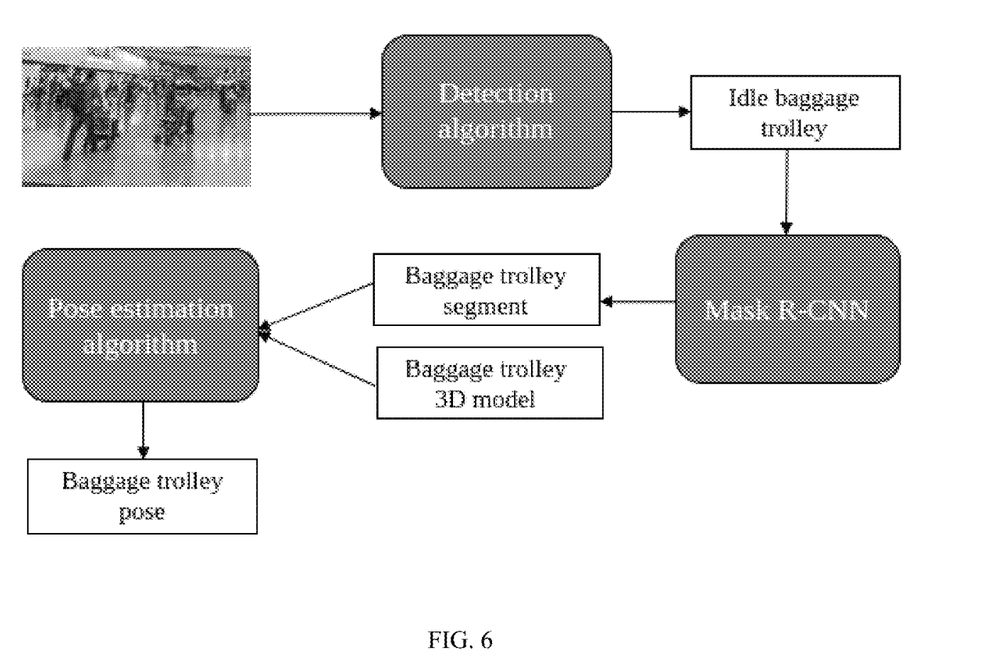
FIG. 6 is a diagram of a baggage trolley recognition and pose estimation module of the baggage/luggage trolley collection robot system for automatically collecting the trolley, according to an embodiment of the subject invention.

With the coarse pose estimation method, the baggage/luggage robotic trolley collection system 100 could roughly get the pose of the trolley when they are far away from each other. When the distance from the baggage/luggage robotic trolley collection system 100 to the trolley is smaller than a certain threshold, the fine pose estimation method can be activated for more precisely leading the baggage/luggage robotic trolley collection system 100 to the location of the trolley for forking and transferring the trolley, as shown in FIG. 6.

In particular, the fine pose estimation step includes:

1) collecting RGB-D images of the baggage/luggage trolley in the environment and establishing a database with depth information for baggage trolley pose estimation;

2) scanning a 3D model of the idle baggage trolley with the depth camera 118;

3) training a pose estimation neural network with the RGB-D images of the idle trolley; and 4) estimating the trolley pose with the trained neural network and the 3D model.

4. Visual Servoing for Catching the Trolley

The pose of the trolley can be estimated by the trolley pose estimation method as discussed above. After the trolley pose is obtained, the position-based visual servoing step is utilized for guiding the baggage/luggage robotic trolley collection system 100 to the back of the trolley for coupling to the idle trolley and forking the trolley. When the manipulator 106 is placed under the trolley, the electric cylinder will be activated for lifting the trolley above the ground. Then the trolley will be transferred to the designated place for people to use.

In certain embodiment, a non-transitory computer-readable medium is provided, comprising program instructions stored thereon that, when executed, cause a processor to perform a method for operating a robotic trolley collection system, the method comprising steps of localizing and mapping the robotic trolley collection system; detecting an idle trolley and estimating pose of the idle trolley; visual servoing control of the robotic trolley collection system; and issuing motion control commands to the robotic trolley collection system for automatically collecting the idle trolley.

The baggage/luggage robotic trolley collection system of the subject invention can autonomously collect idle trolleys without human intervention, drastically reducing the human labor and release human from heavy workload. Moreover, the baggage/luggage robotic trolley collection system does not require remodeling the existing trolleys, saving significant amount of remodeling cost comparing to the existing autonomous trolley collection robots.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

[1] Sun Y, Liu M, Meng M Q H. Improving RGB-D SLAM in dynamic environments: A motion removal approach[J]. Robotics and Autonomous Systems, 2017, 89: 110-122.
[2] Wang L, Liu M, Meng M Q H. Real-time multisensor data retrieval for cloud robotic systems[J]. IEEE Transactions on Automation Science and Engineering, 2015, 12(2): 507-518.
[3] Song S, Li B, Qiao W, et al. 6-D magnetic localization and orientation method for an annular magnet based on a closed-form analytical model[J]. IEEE Transactions on Magnetics, 2014, 50(9): 1-11.
[4] Li Y, Li S, Song Q, et al. Fast and robust data association using posterior based approximate joint compatibility test[J]. IEEE Transactions on Industrial Informatics, 2013, 10(1): 331-339.
[5] Luo C, Yang S X, Li X, et al. Neural-dynamics-driven complete area coverage navigation through cooperation of multiple mobile robots[J]. IEEE Transactions on Industrial Electronics, 2016, 64(1): 750-760.

We claim:

1. A robotic trolley collection system, comprising:
a differential-driven mobile base;
a manipulator fixedly installed at the differential-driven mobile base for coupling with a trolley, having a structure same as or configured complementary to a head portion of the trolley;
a sensory and measurement assembly for providing sensing and measurement dataflow; and
a main processing case for processing the sensing and measurement dataflow provided by the sensory and measurement assembly and for controlling the differential-driven mobile base, the manipulator, and the sensory and measurement assembly.

2. The robotic trolley collection system of claim 1, wherein the differential-driven mobile base comprises a mobile chassis having a plurality of driving wheels, a plurality of direct current (DC) motors, and at least one gearbox; and
wherein the plurality of driving wheels is propelled by the plurality of direct current (DC) motors, respectively, through the at least one gearbox for moving the robotic trolley collection system.

3. The robotic trolley collection system of claim 2, wherein the differential-driven mobile base further comprises a plurality of omnidirectional passive castor wheels disposed at back of the differential-driven mobile base for support.

4. The robotic trolley collection system of claim 3, wherein the differential-driven mobile base further comprises a protective member attached to the mobile chassis and a plurality of proximity switches for obstacle avoidance.

5. The robotic trolley collection system of claim 1, wherein the manipulator is coupled to a front end of the differential-driven mobile base, and wherein the manipulator comprises three connections including two hinge sections at the front end of the differential-driven mobile base and a flexible connection having an electronic cylinder disposed in a middle part of the differential-driven mobile base.

6. The robotic trolley collection system of claim 5, wherein when the manipulator is coupled to the back portion of the trolley, the manipulator is configured to fork the trolley.

7. The robotic trolley collection system of claim 6, wherein when the manipulator is coupled to the back of the trolley, the electronic cylinder lifts the trolley off the ground for trolley transfer.

8. The robotic trolley collection system of claim 1, wherein the sensory and measurement assembly is disposed on top of the main processing case that is disposed on top of the differential-driven mobile base.

9. The robotic trolley collection system of claim 1, wherein the main processing case comprises a controller or a data processor for receiving the dataflow from the sensory and measurement assembly and generating control commands that are transmitted to the manipulator, the differential-driven mobile base, or the sensory and measurement assembly.

10. The robotic trolley collection system of claim 1, wherein the sensory and measurement assembly comprises a three dimensional (3D) light detection and ranging (LiDAR) device for localization of the robotic trolley collection system and for obstacle avoidance.

11. The robotic trolley collection system of claim 1, wherein the sensory and measurement assembly comprises a depth camera for detecting an idle trolley and estimating pose of the idle trolley.

12. The robotic trolley collection system of claim 1, wherein the sensory and measurement assembly comprises a plurality of ultrasound sensors disposed at front of the differential-driven mobile base for obstacle avoidance.

13. A method for operating a robotic trolley collection system, the robotic system including a differential-driven mobile base, a manipulator mounted on the differential-driven mobile base for coupling with a trolley, a sensory and measurement assembly for providing sensing and measurement dataflow, and a main processing case for processing the sensing and measurement dataflow provided by the sensory and measurement assembly and for controlling the differential-driven mobile base, the manipulator, and the sensory and measurement assembly, the method comprising:
localizing and mapping;
detecting an idle trolley to be collected and estimating pose of the idle trolley;
visual servoing control of the robotic trolley collection system; and
issuing motion control commands to the robotic trolley collection system for automatically moving and collecting the idle trolley.

14. The method for operating a robotic trolley collection system of claim 13, wherein the localizing and mapping comprises determining location of the robotic trolley collection system and providing the determined location information of the robotic trolley collection system to allow the robotic trolley collection system to determine its position in surrounding environment.

15. The method for operating a robotic trolley collection system of claim 13, wherein the detecting an idle trolley and estimating pose of the idle trolley comprises providing detection results of the idle trolley and estimating the pose of the idle trolley.

16. The method for operating a robotic trolley collection system of claim 13, wherein the visual servoing comprises driving the robotic trolley collection system to approach the idle trolley, forking the idle trolley by performing servoing control of the robotic trolley collection system, and transferring the idle trolley to a desired location.

17. The method for operating a robotic trolley collection system of claim 13, wherein the localizing and mapping the robotic trolley collection system comprises combining location information provided by a LiDAR device, a wheel odometer, or a depth camera of the robotic trolley collection system.

18. The method for operating a robotic trolley collection system of claim 13, wherein the detecting an idle trolley comprises:
 collecting RGB images of a trolley and establishing datasets for recognizing the trolley;
 annotating bounding boxes and status categories of the trolley in the RGB images; and
 training a deep neural network system with the collected datasets to determine if the trolley is in an idle condition and ready to be collected.

19. The method for operating a robotic trolley collection system of claim 13, wherein the estimating pose of the idle trolley comprises performing a coarse pose estimating step followed by performing a fine pose estimating step.

20. A non-transitory computer-readable medium comprising program instructions stored thereon that, when executed, cause a processor to perform a method comprising steps of:
 localizing and mapping;
 detecting an idle trolley and estimating pose of the idle trolley;
 visual servoing control of a robotic trolley collection system; and
 issuing motion control commands to the robotic trolley collection system for automatically collecting the idle trolley.

* * * * *